United States Patent [19]
House et al.

[11] Patent Number: 5,890,158
[45] Date of Patent: Mar. 30, 1999

[54] METHOD, APPARATUS, AND PROGRAM STORAGE DEVICE FOR SHARING OBJECTS WITH A NETWORK SERVER AND A DATABASE SERVER USING A COMMON OBJECT MODEL

[75] Inventors: Daniel Edward House; Brian Joseph Owings, both of San Jose; Shiau-Shiau Pei, Saratoga, all of Calif.

[73] Assignee: International Business Machines Corporation, Armonk, N.Y.

[21] Appl. No.: 828,476

[22] Filed: Mar. 31, 1997

[51] Int. Cl.⁶ ................................................. G06F 15/173
[52] U.S. Cl. ........................... 707/10; 707/501; 707/513; 395/200.33; 395/200.41; 395/200.47; 395/200.53
[58] Field of Search ........................... 707/10, 501, 513; 395/200.33, 200.41, 200.47, 200.53

[56] References Cited

U.S. PATENT DOCUMENTS

| | | | |
|---|---|---|---|
| 5,168,441 | 12/1992 | Onarheim et al. | 364/146 |
| 5,179,698 | 1/1993 | Bachman et al. | 707/4 |
| 5,193,182 | 3/1993 | Bachman et al. | 700/100 |
| 5,193,183 | 3/1993 | Bachman | 707/100 |
| 5,195,178 | 3/1993 | Krieger et al. | 345/347 |
| 5,241,645 | 8/1993 | Cimral et al. | 395/500 |
| 5,249,300 | 9/1993 | Bachman et al. | 707/104 |
| 5,596,745 | 1/1997 | Lai et al. | 707/103 |
| 5,696,961 | 12/1997 | Briscoe et al. | 707/2 |
| 5,706,502 | 1/1998 | Foley et al. | 707/10 |
| 5,710,918 | 1/1998 | Lagarde et al. | 707/10 |
| 5,732,219 | 3/1998 | Blumer et al. | 395/200.57 |
| 5,737,592 | 4/1998 | Nguyen et al. | 707/4 |
| 5,742,762 | 4/1998 | Scholl et al. | 707/200.3 |

*Primary Examiner*—Thomas G. Black
*Assistant Examiner*—Jean R. Homere
*Attorney, Agent, or Firm*—Merchant, Gould, Smith, Edell, Welter, & Schmidt

[57] ABSTRACT

A method, apparatus, and program storage device for sharing objects with a network server and a database server using a common object model. A first set of objects is stored in a common file accessible by a network server and a database server. A second set of objects is stored in the common file. The first set of objects has network server executable logic and the second set of objects has database server executable logic. The first set of objects are published to the network server and the second set of objects are built in the database server. Building the second set of objects involves building a data link library (DLL) stub for the database server to run intermediate code language on the database server.

18 Claims, 7 Drawing Sheets

METHOD, APPARATUS, AND PROGRAM STORAGE DEVICE FOR SHARING OBJECTS WITH A NETWORK SERVER AND A DATABASE SERVER USING A COMMON OBJECT MODEL

CROSS-REFERENCE TO RELATED APPLICATIONS

This application is related to the following co-pending and commonly-assigned patent applications:

Application Serial No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed on same date herewith, by Daniel E. House, Brian J. Owings, and Shiau-Shiau Pei;

Application Ser. No. 08/828,480, entitled "REMOTE SCRIPTING OF LOCAL OBJECTS," filed on same date herewith, by Daniel E. House, Constance J. Nelin, and Rebecca B. Nin;

Application Ser. No. 08/828,989, entitled "METHOD AND APPARATUS FOR SIMULATING A MULTI-TIERED COMPUTER ENVIRONMENT," filed on same date herewith, by Daniel E. House and Constance J. Nelin;

Application Ser. No. 08/828,478, entitled "MULTI-TIER VIEW PROJECT WINDOW," filed on same date herewith, by Howard J. Glaser, Daniel E. House, and Constance J. Nelin;

Application Ser. No. 08/829,104, entitled "EXTENDER USER INTERFACE," filed on same date herewith, by Thomas E. Conrad, Howard J. Glaser, Jean C. Ho, James L. Keesey, Constance J. Nelin, and Gerold J. Wilmot;

Application Ser. No. 08/828,846, entitled "SHARED MODULES GRAPHICAL USER INTERFACE," filed on same date herewith, by Howard J. Glaser, Daniel E. House, and Constance J. Nelin;

Application Ser. No. 08/828,479, entitled "QUERY SELECTION FOR A PROGRAM DEVELOPMENT ENVIRONMENT," filed on same date herewith, by Howard J. Glaser and Mary C. Lehner;

Application Ser. No. 08/828,477, entitled "DOCKING AND FLOATING MENU/TOOL BAR," filed on same date herewith, by Howard J. Glaser, Stewart E. Nickolas, and Karl D. Johnson;

Application Ser. No. 08/828,890, entitled "HTML INTEGRATION UTILITY FOR A PROGRAM DEVELOPMENT ENVIRONMENT," filed on same date herewith, by Howard J. Glaser;

Application Ser. No. 08/828,897, entitled "EXTENDER SMART GUIDE," filed on same date herewith, by Howard J. Glaser;

Application Ser. No. 08/828,481, entitled "MULTI-TIER DEBUGGING," filed on same date herewith, by Daniel E. House and Constance J. Nelin; and Application Ser. No. 08/828,990, entitled "DYNAMIC DISCOVERY OF CONTROLS," filed on same date herewith, by Daniel E. House and Constance J. Nelin; all of which applications are incorporated by reference herein.

BACKGROUND OF THE INVENTION

1. Field of the Invention

This invention relates in general to programming development environments performed by computers, and in particular, to a shared object model that allows transparent execution on multiple architectures.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO).

Thus, there is a need in the art for methods of accessing RDBMS software across an Internet or Intranet, and especially via Web-based networks. Further, there is a need for simplified development environments for such systems. For example, current development environments have separate, fragmented, non-associated files for each aspect of the project. These separate files must be pulled together from separate sources to build the project. Another problem with current development environments is an inability to support transparent execution on different architectures. For example, the architecture of RDBMSs accessed via the Internet may be differ substantially, complicating the development environment and the resulting application.

SUMMARY OF THE INVENTION

To overcome the limitations in the prior art described above, and to overcome other limitations that will become apparent upon reading and understanding the present specification, the present invention discloses a method, apparatus, and article of manufacture employing a shared object model. The invention comprises the steps or elements of storing a first set of objects in a common file accessible by a network server and a database server and storing a second set of objects in the common file.

The first set of objects comprises network server executable logic, and the second set of objects comprise database server executable logic. The first set of objects are published to the network server and the second set of objects are built in the database server.

The apparatus comprises a means for storing the objects in a common file accessible by a network and a database server, a means for publishing a first set of the objects comprising network executable logic to the network server and for building the second set of objects in the database server.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
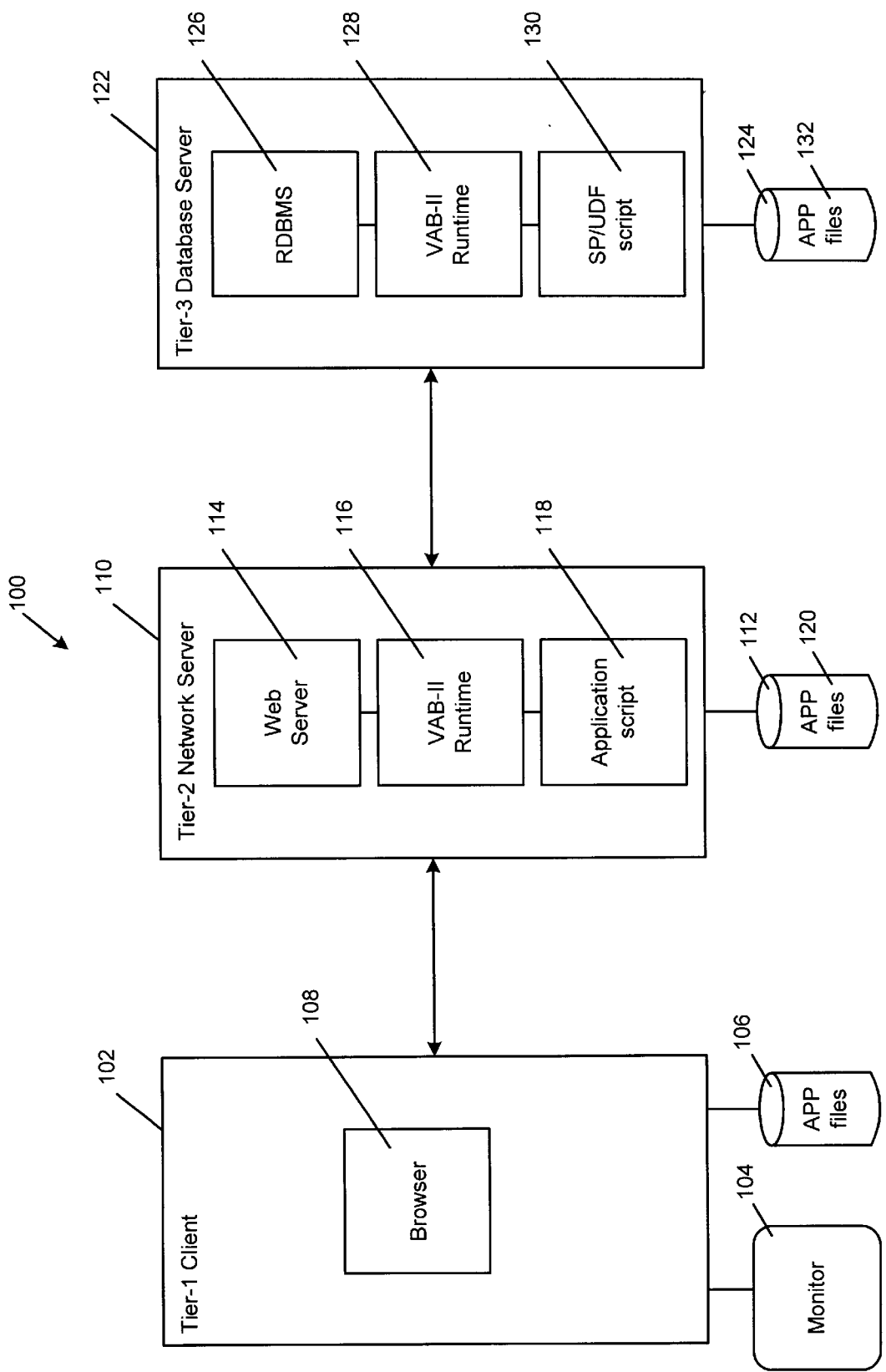
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
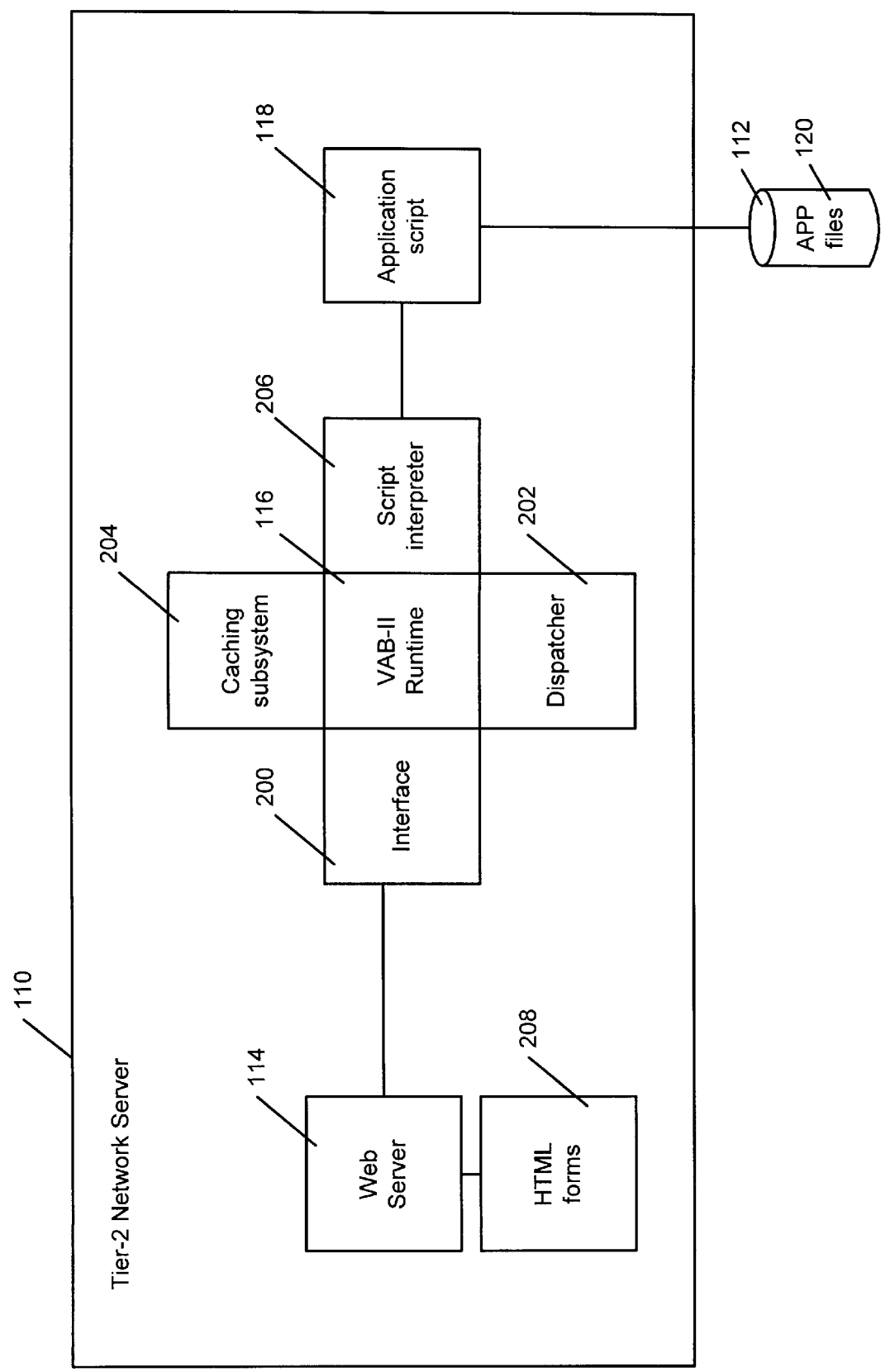
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
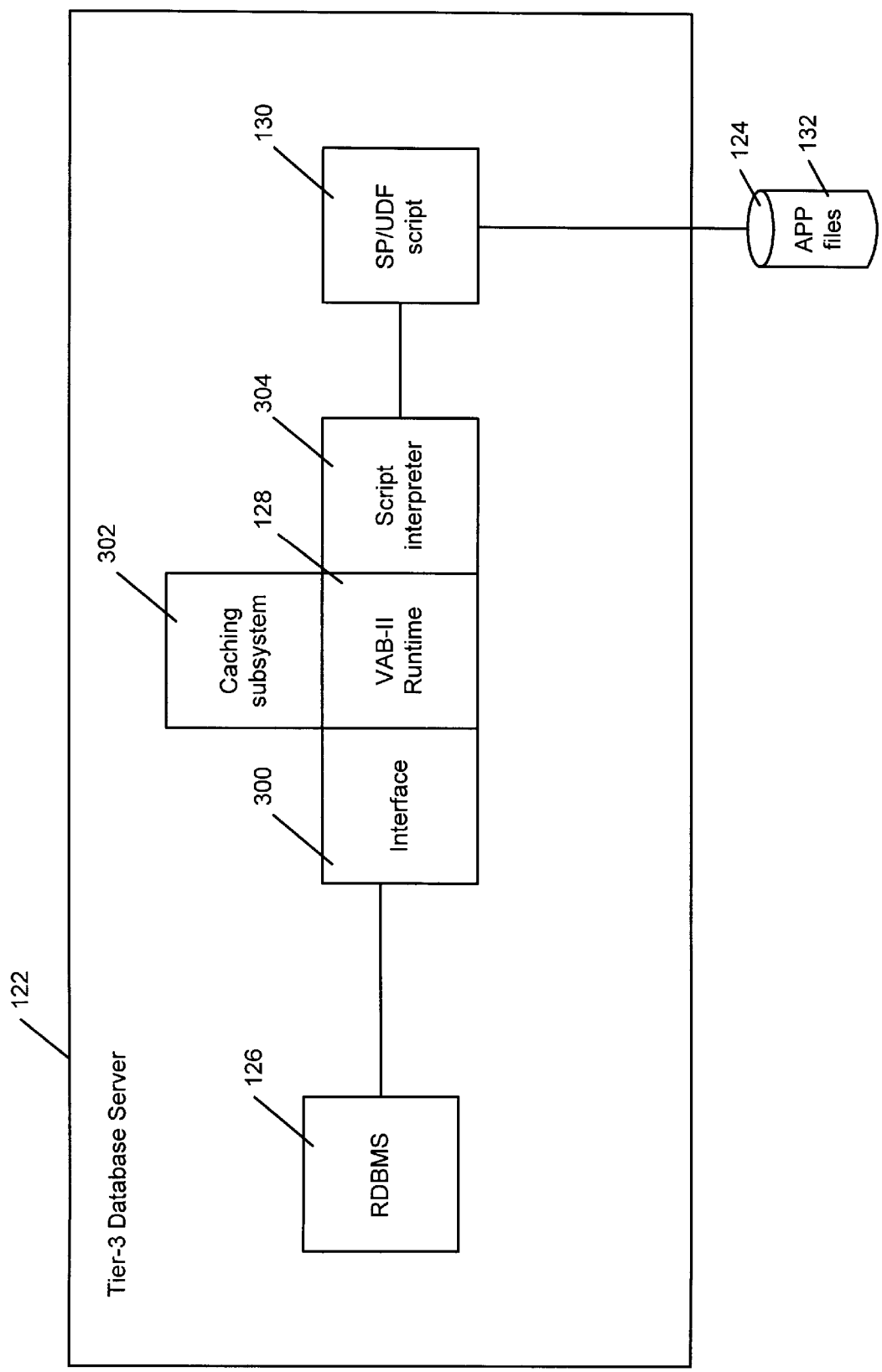
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
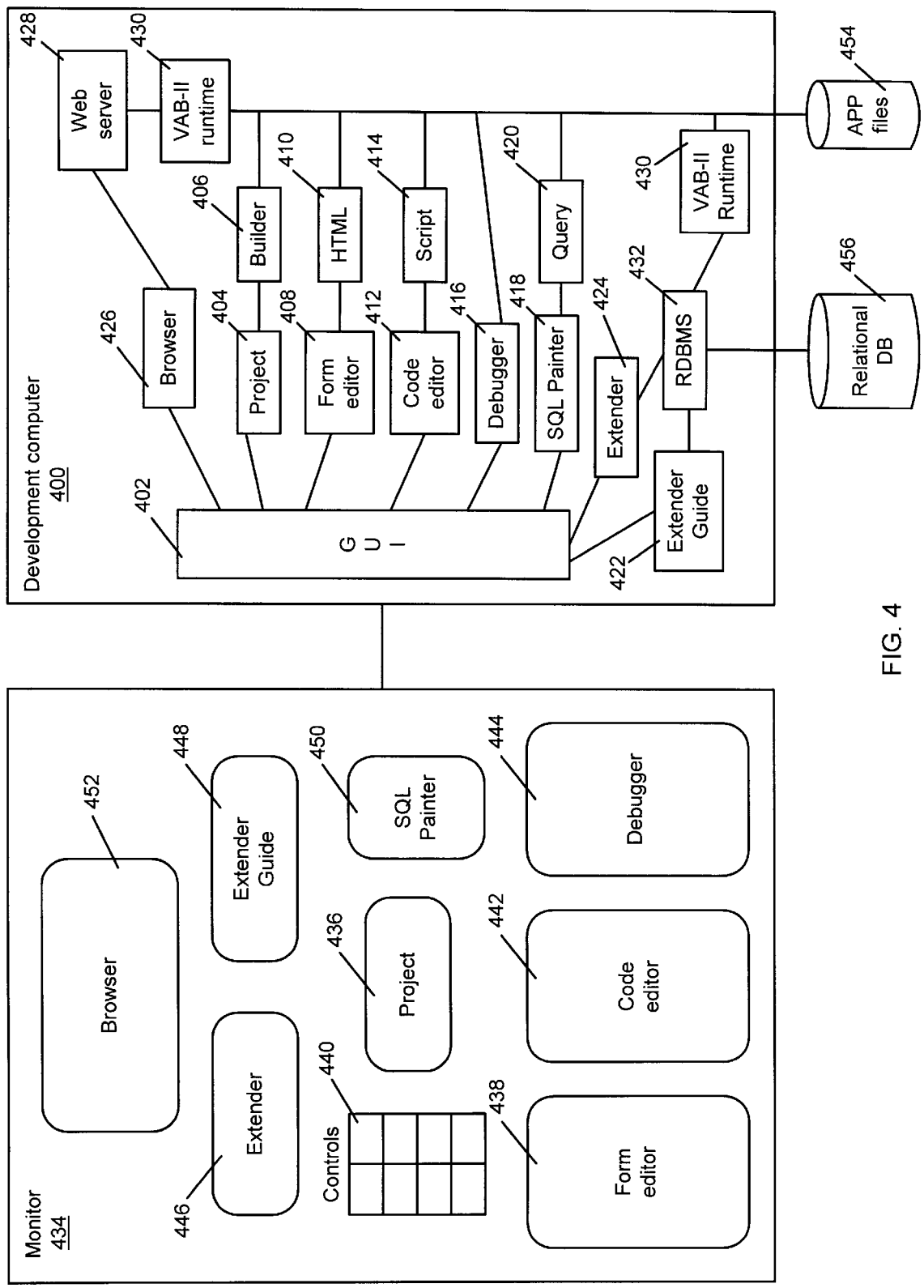
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

"Publish" and "Build" Shared Object Model Operations

Figure 5A:
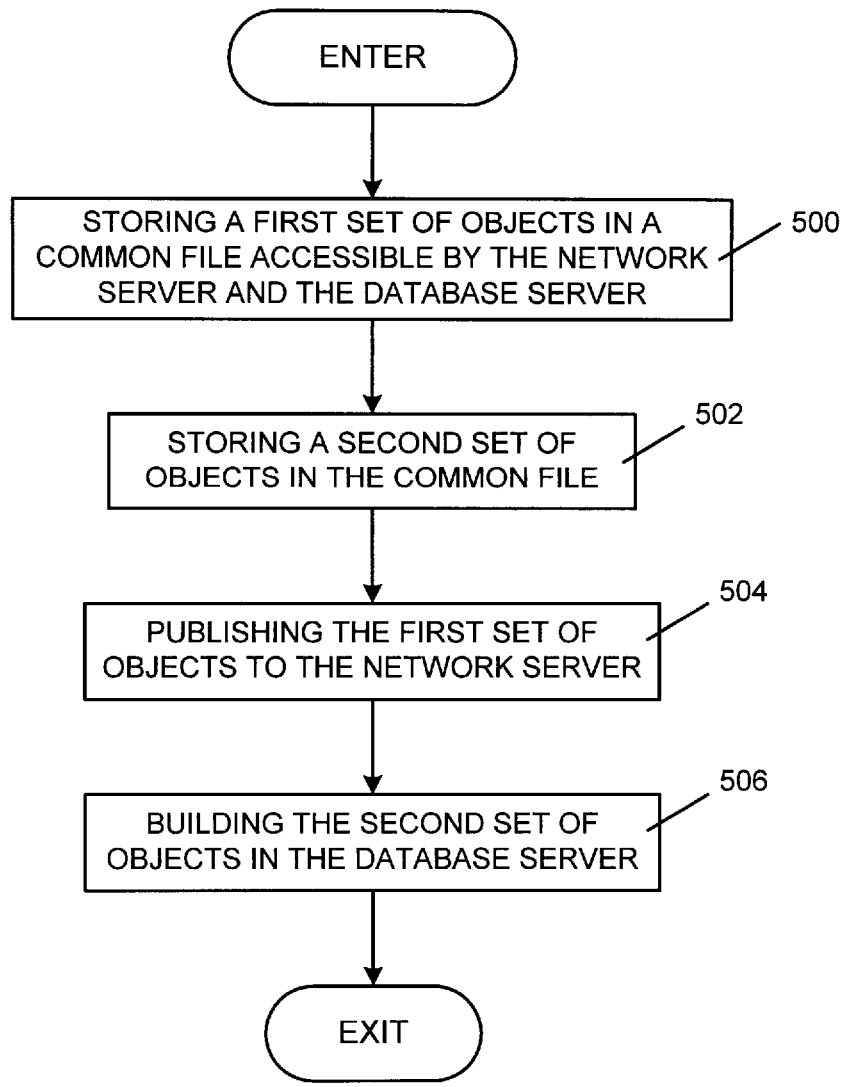
FIGS. 5A, 5B, and 5C are flow charts illustrating the method steps employed in the present invention.
Figure 5B:
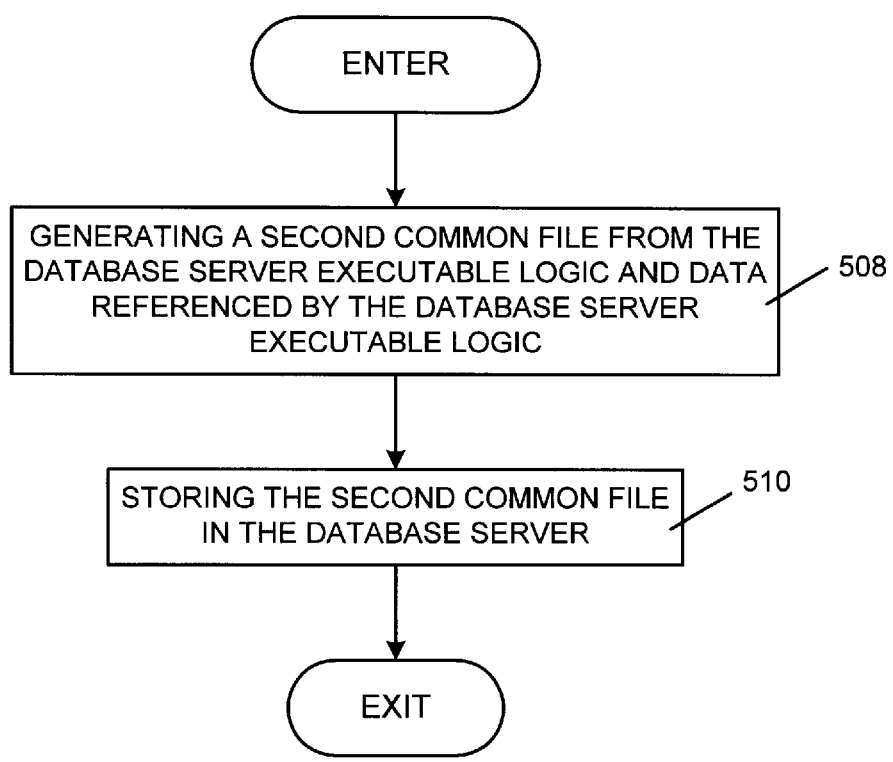
Figure 5C:
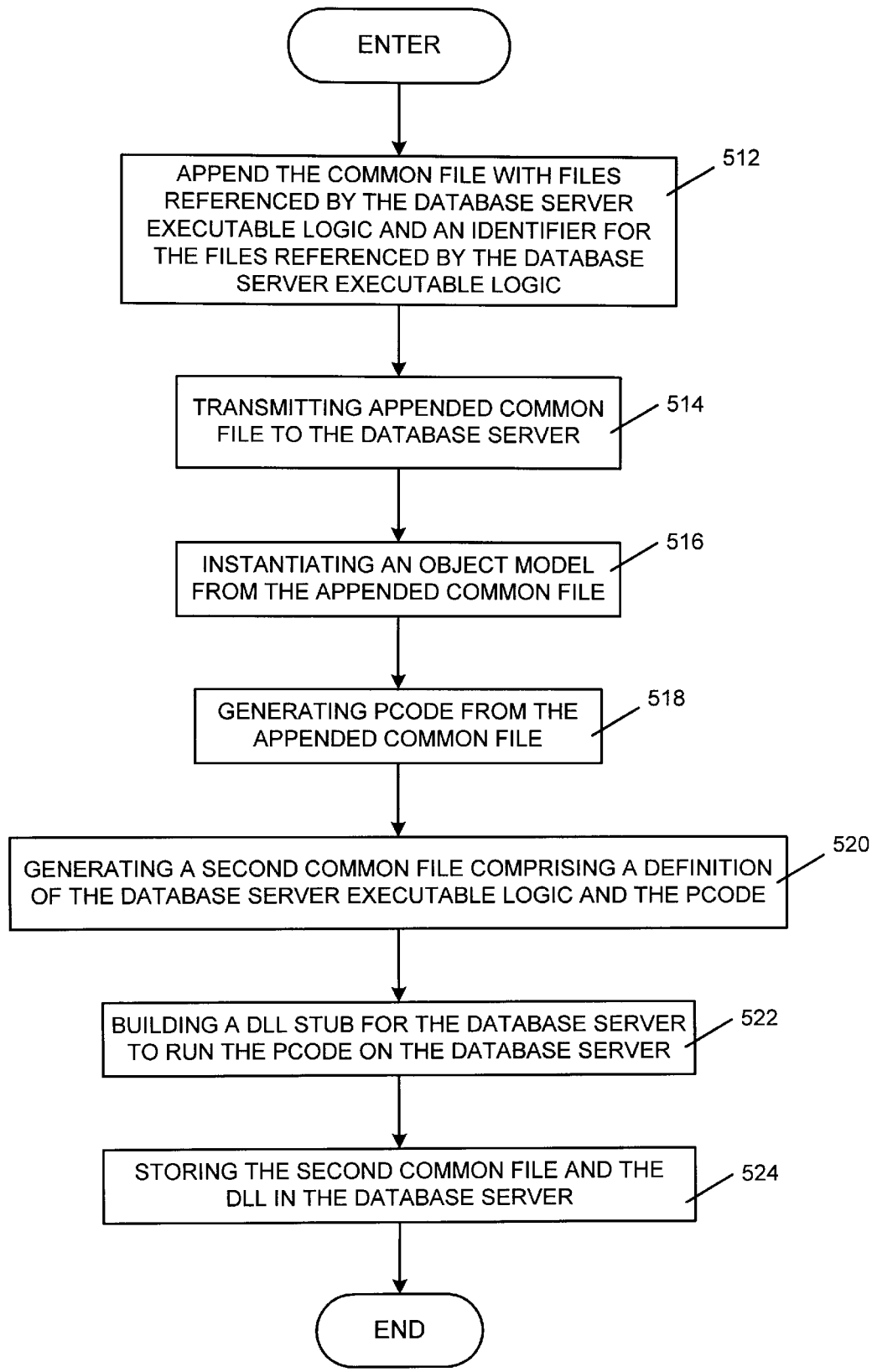

FIGS. 5A–5C describe the use of the "publish" and "build" operations used in connection with the shared object model employed with the present invention. FIG. 5A presents a top level flow chart of method steps employed. When developers create a form-based application, they create a number of objects including the tier-1 102 view, the network server or tier-2 110 and database server or tier-3 122 programming or executable logic. This can be the final view of the client 102 (generated HTML published to the web server) or it can be a template from which other views onto the application are constructed. These objects are stored in the APP file 454, which is accessible by both the network server 110 and the RDBMS server 112. This process stores objects and other information in a common file accessible to both the network server 110 and the database server 120 in the APP file 118, and is shown in blocks 500 and 502.

After development, the application can be deployed to a tier-2 network server 110 and a tier-3 database server 122. This is referred to as "publishing" the tier-2 application script and associated HTML pages, and "building" the tier-3 SP/UDF script, respectively. In this process, the first set of objects are published to the network server 110 and the second set of objects are "built" to the database server 122. This process is shown in FIG. 5A and further described below with reference to FIGS. 5B and 5C.

An application is "published" to the network, or tier-2 server 112 by completing the application on a development machine 400, and selecting a "publish" menu item. An application is "completed" by generating the appropriate HTML and storing the application under a directory representing this application in the local browser 102. Essentially, the local application is "published" to the local machine in a place where the httpd on the local development machine 400 can "serve it," the local copy of VAB-II runtime 116, 118 can run it (by, for example, selecting a RunLocal menu item), and the VAB-II builder 208 and LotusScript IDE can debug it.

Selecting "publish" from the menu item moves the tier-2 application and the tier-2 HTML to a server. There is no control over the HTML once it is published. The generated HTML display and the LotusScript programming logic can be published to multiple network servers or they can reside on the same network server, such as the tier-2 network server 110. This provides more flexibility than requiring the logic server and the HTML server to reside on the same machine. Moreover, although the HTML and the programming logic are often published together, but both steps are not always required. For example, if only LotusScript programming logic was changed, there is no need to republish HTML.

When publishing HTML, it is not necessary to publish all of the generated HTML pages. For example, perhaps only one page (form) was changed and that page will be replaced, but the other pages were manually changed. In this case, the developer wishes to replace only one page and not "overlay" all of the others. Changing the LotusScript programming logic does not require HTML to be republished.

FIG. 5B shows the method steps employed in building the second set of objects to the database server in one embodiment of the present invention. First, as shown in block 508, a second common file is generated in the APP file 118 format from the database server executable logic. This represents a subset of the common object model which defines the executable logic, including any SP/UDF scripts as well as the build options. All externally referenced files are then copied into the APP file 132 in addition to keeping the original file reference. Ordinarily, the source code is included in the APP file 132 being sent to the server during the build process, however, the user can specify an option such that the source will not be kept on the server after the build completes. Next, as shown in block 510, the second common file is transmitted to and stored in the database server 112.

FIG. 5C shows the method steps employed in building the second set of objects to the database server in another embodiment of the present invention. First, the common APP file 454 contains files referenced by the database server executable logic and an identifier for the files. This process, which is shown in block 512 is initiated by a "build" request which calls a stored procedure on the database server passing the APP file 118.

Next, the appended common APP file 454 is transmitted to the database server 110, as represented by block 514. Then, as shown in block 516, an object model is instantiated from the appended common APP file 454. Pcode is then generated from the appended common APP file 454. This is represented in block 518. Next, a second common APP file 132 comprising the pcode and a definition of the database server executable logic is created. This is illustrated in block 520. The resulting second common APP file 132 contains the SP/UDF definition, the pcode, and optionally, the source code. At this point, any meta information needed to support the browser 108 can be stored in the RDBMS 126 tables in addition to the new APP file 132.

Next, a data link library (DLL) stub is built, as shown in block 522. The RDBMS 122 calls this DLL stub to run the SP/UDF. Then, a stored procedure catalog is updated for future reference and application management. This step occurs separately for a UDF. Finally, when the build completes successfully, the build information in the common object model in the development session is updated. The resulting files in the server are the SP/UDF DLL, the APP file 132, and a bind file, which the RDBMS 126 manages. If desired, the present invention allows the user to build on multiple servers by repeating all of the above on all of the requested servers.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture employing a shared object model. The method comprises the steps of storing a first set of objects in a common file accessible by a network server and a database server and storing a second set of objects in the common file. The first set of objects comprises network server executable logic, and the second set of objects comprise database server executable logic. The first set of objects are published to the network server and the second set of objects are built in the database server.

The apparatus comprises a means for storing the objects in a common file accessible by a network and a database server, a means for publishing a first set of the objects comprising network executable logic to the network server and for building the second set of objects in the database server.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of sharing objects for a software project with a network server and a database server using a common object model, comprising the steps of:

storing a first set of objects in a common file accessible by the network server and the database server, the first set of objects comprising network server executable logic;

storing a second set of objects in the common file, the second set of objects comprising database server executable logic;

publishing the first set of objects to the network server; and building the second set of objects in the database server wherein building the second set of objects comprises building a data link library (DLL) stub for the database server to run intermediate code language on the database server.

2. The method of claim 1, wherein the first set of objects further comprises forms.

3. The method of claim 1, wherein the building step comprises the steps of generating a second file from the database server executable logic and data referenced by the database server executable logic; and storing the second file in the database server.

4. The method of claim 1, wherein the intermediate code language is pcode, and wherein the building step comprises the steps of:

appending the common file with files referenced by the database server executable logic and an identifier for the files referenced by the database server executable logic;

transmitting the appended common file to the database server;

instantiating an object model from the appended common file;

generating pcode from the appended common file;

generating second common file comprising a definition of the database server executable logic and the pcode; and storing the second common file and the DLL in the database server.

5. The method of claim 1, wherein the step of publishing the first set of objects to the network server comprises the step of copying the network server executable logic to the network server.

6. The method of claim 5, wherein the first set of objects further comprises a form, and the step of publishing comprises the step of copying the network server executable logic and the form to the network server.

7. An apparatus for sharing software project objects with a network server and a database server using a common object model, comprising:

means for storing a first set of objects in a common file accessible by the network server and the database server, the first set of objects comprising network server executable logic;

means for storing a second set of objects in the common file, the second set of objects comprising database server executable logic;

means for publishing the first set of objects to the network server; and means for building the second set of objects in the database server, wherein the means for building the second set of objects comprises means for building a data link library (DLL) stub for the database server to run intermediate code language on the database server.

8. The apparatus of claim 7, wherein the first set of objects further comprises forms.

9. The apparatus of claim 8, wherein the building means comprises:

means for generating a second common file from the database server executable logic; and means for storing the second common file in the database server.

10. The apparatus of claim 8, wherein the intermediate code language is pcode, and wherein the building means comprises:

means for appending the common file with files referenced by the database server executable logic and an identifier for the files referenced by the database server executable logic;

means for transmitting the appended common file to the database server;

means for instantiating an object model from the appended common file;

means for generating pcode from the appended common APP file;

means for generating second common file comprising a definition of the database server executable logic and the pcode; and means for storing the second common file and the DLL in the database server.

11. The apparatus of claim 8, wherein publishing means comprises a means for copying the network server executable logic to the network server.

12. The apparatus of claim 11, wherein the first set of objects further comprises a form and the apparatus further comprises means for copying the network server executable logic and the form to the network server.

13. A program storage device, readable by a computer having a processor, a memory and a data storage device, tangibly embodying one or more programs of instructions executable by the computer to perform method steps of sharing objects for a software project with a network server and a database server using a common object model, the method comprising the steps of:

storing a first set of objects in a common file accessible by the network server and the database server, the first set of objects comprising network server executable logic;

storing a second set of objects in the common file, the second set of objects comprising database server executable logic;

publishing the first set of objects to the network server; and building the second set of objects in the database server wherein building the second set of objects comprises, building a data link library (DLL) stub for the database server to run intermediate code language on the database server.

14. The program storage device of claim 13, wherein the first set of objects further comprises forms.

15. The program storage device of claim 13, wherein the method further comprises the steps of:

generating a second common file from the database server executable logic and data referenced by the database server executable logic; and storing the second common file in the database server.

16. The program storage device of claim 13, wherein the intermediate code language is pcode, and wherein the building step further comprises the steps of:

appending the common file with files referenced by the database server executable logic and an identifier for the files referenced by the database server executable logic;

transmitting the appended common file to the database server;

instantiating an object model from the appended common file;

generating pcode from the appended common APP file;

generating second common file comprising a definition of the database server executable logic and the pcode; and storing the second common file and the DLL in the database server.

17. The program storage device of claim 13, wherein step of publishing the first set of objects to the network server comprises the step of copying the network server executable logic to the network server.

18. The program storage device of claim 17, wherein the first set of objects further comprises a form, and the step of publishing comprises the step of copying the network server executable logic and the form to the network server.

* * * * *